(12) United States Patent
De Carné-Carnavalet (10) Patent No.: US 12,326,117 B2
(45) Date of Patent: Jun. 10, 2025

(54) TURBINE ENGINE FOR AN AIRCRAFT

(71) Applicant: SAFRAN AIRCRAFT ENGINES, Paris (FR)

(72) Inventor: Vincent Marie Jacques Rémi De Carné-Carnavalet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/256,259

(22) PCT Filed: Dec. 2, 2021

(86) PCT No.: PCT/FR2021/052188
§ 371 (c)(1),
(2) Date: Jun. 7, 2023

(87) PCT Pub. No.: WO2022/123151
PCT Pub. Date: Jun. 16, 2022

(65) Prior Publication Data
US 2024/0018905 A1    Jan. 18, 2024

(30) Foreign Application Priority Data

Dec. 8, 2020 (FR) ........................... 2012877

(51) Int. Cl.
*F02C 7/14* (2006.01)
*F02C 6/08* (2006.01)
(Continued)

(52) U.S. Cl.
CPC .............. *F02C 7/14* (2013.01); *F02C 6/08* (2013.01); *F02C 7/18* (2013.01); *F02C 9/18* (2013.01)

(58) Field of Classification Search
CPC .................................... F02C 7/14; F02C 7/18
See application file for complete search history.

(56) References Cited

U.S. PATENT DOCUMENTS

| 5,107,676 A * | 4/1992 | Hadaway ............ F16H 57/0482 60/39.08 |
| 2005/0081530 A1 * | 4/2005 | Bagnall ................. F04D 29/526 60/785 |

(Continued)

FOREIGN PATENT DOCUMENTS

| EP | 3 296 517 A1 | 3/2018 |
| FR | 3014080 A1 * | 6/2015 ............. B64D 33/10 |

OTHER PUBLICATIONS

International Search Report mailed Mar. 28, 2022, issued in corresponding International Application No. PCT/FR2021/052188, filed Dec. 2, 2021, 5 pages.

(Continued)

*Primary Examiner* — Lorne E Meade
*Assistant Examiner* — Alyson Joan Harrington
(74) *Attorney, Agent, or Firm* — CHRISTENSEN O'CONNOR JOHNSON KINDNESS PLLC (57) ABSTRACT

A turbine engine extends along an axis (X) and includes a flow path of a primary flow (F1) that has a compressor, a combustion chamber, and a turbine. The turbine engine further includes an outflow region of a secondary flow (F2) that surrounds the primary path, a blower or a propeller located upstream of the primary path and the outflow region of the secondary flow (F2), at least one arm extending radially through the primary path, and at least one fluid circulation pipe extending inside the arm. The arm includes an inlet for air from the primary path so as to cool the fluid circulating in the pipe.

10 Claims, 6 Drawing Sheets

(51) Int. Cl.
    *F02C 7/18*    (2006.01)
    *F02C 9/18*    (2006.01)

(56) References Cited

U.S. PATENT DOCUMENTS

| | | |
|---|---|---|
| 2015/0330308 A1 | 11/2015 | Goupil et al. |
| 2017/0002685 A1 | 1/2017 | Todorovic |
| 2017/0370326 A1* | 12/2017 | Feulner .................... F02K 3/06 |
| 2022/0412260 A1* | 12/2022 | Ellbrant ................. F01D 25/18 |
| 2023/0203955 A1* | 6/2023 | Rikemanson ........... F01D 9/041 |
| | | 415/115 |

OTHER PUBLICATIONS

Written Opinion mailed Mar. 28, 2022, issued in corresponding International Application No. PCT/FR2021/052188, filed Dec. 2, 2021, 6 pages.

* cited by examiner

TURBINE ENGINE FOR AN AIRCRAFT

FIELD OF THE DISCLOSURE

The disclosure relates to a turbine engine, such as a turbojet or turboprop engine of an aircraft, in particular an airplane.

BACKGROUND

A turbine engine conventionally includes a flow path for a primary flow, or primary flow path, including a compressor, a combustion chamber and a turbine, an outflow region of a secondary flow, surrounding the primary flow path, and a fan or a propeller located upstream of the primary flow path and the outflow region of the secondary flow.

The outflow region of the secondary flow may be delimited radially outside by a shroud, so as to delimit a flow path for a secondary flow, or secondary flow path. Alternatively, the outflow region of the secondary flow may also be unducted.

The turbine engine further includes a fan or a propeller, located upstream of the primary flow path and the outflow region of a secondary flow. An element of the turbine engine surrounds the primary flow path and is located downstream of the fan and allows separating the primary flow from the secondary flow. For example, this element is formed by a portion of an intermediate casing.

Profiled arms extend generally radially through the primary flow path, so as to enable the passage of transmission or auxiliary elements through the arms.

The new types of turbine engine architecture have elements like power transmission boxes or reducers, whose gears have significant lubrication requirements. In addition, some systems also have systems for changing the pitch of fan blades which further add to the lubrication demand. Of course, these increased needs add to the conventional lubrication needs of the turbine engine. Thus, the new architectures require a considerable oil requirement and, at the same time, a need for cooling this oil higher than conventional architectures.

The reducer and the pitch change mechanisms are generally located in the radially inner portion of the turbine engine and are supplied with lubricating oil by pipes. These then conventionally transit through the primary flow, inside the aforementioned arms, in order to ensure the connection between these oil-consuming systems and the systems ensuring the circulation as well as cooling of the oil.

Today there is a need to improve cooling of the oil circulating through these pipes.

Indeed, the much higher lubrication needs of new turbine engine architectures imply a considerable increase in the need for heat exchange in order to cool the lubricant. The heat exchange systems used in conventional turbine engine architectures are not enough or lead to prohibitive performance losses in the operation of the turbine engine.

SUMMARY

The disclosure aims to address this need, in a simple, reliable and inexpensive manner.

To this end, the disclosure relates to a turbine engine extending according to an axis, including a flow path for a primary flow including a compressor, a combustion chamber and a turbine, an outflow region of a secondary flow, surrounding the primary flow path, a fan or a propeller located upstream of the primary flow path and of the outflow region of the secondary flow, at least one arm extending radially through the primary flow path, at least one fluid circulation pipe extending inside the arm, characterised in that the arm includes an air inlet derived from the primary flow path so as to cool the fluid circulating in the pipe.

The terms axial, radial and circumferential are defined with respect to the axis of the turbine engine. Moreover, the terms upstream and downstream are defined with respect to the direction of circulation of the gases within the turbine engine.

The disclosure suggests taking advantage of the passage of the pipe through the arm in order to carry out all or part of the heat exchanges necessary for cooling the fluid. For this purpose, a portion of the air transiting in the primary flow path is drawn by means of the air inlet of the arm.

Thus, the pipe forms a heat exchanger, in its portion crossing the arm. The pipe may then have, at least in this portion, any suitable shape in order to ensure the heat exchange function.

The air inlet is positioned so as to capture the dynamic pressure derived from the fan or the propeller and entering the primary flow path.

The fluid may be oil or another heat-transfer fluid.

The arm may be located upstream of the compressor. The turbine engine may include a low-pressure compressor and a high-pressure compressor. The arm may then be located before the low-pressure compressor.

In this manner, the air entering the arm has a relatively low temperature, which allows maximising cooling of the fluid circulating in the pipe.

The arm may include two lateral surfaces defining upstream at least one leading edge and downstream at least one trailing edge, the air inlet being located at the leading edge and/or at least at one of the lateral surfaces of the arm.

The air inlet may be formed by an opening.

The air inlet may be located at the leading edge of the arm. The air inlet may then be called a front scoop.

The air inlet may extend circumferentially from the corresponding lateral surface of the arm.

Thus, the air inlet may be located at least at one of the lateral surfaces of the arm. Such an air inlet may also be called a lateral scoop. In this case, the air inlet may be a simple opening or extend circumferentially from the corresponding lateral surface of the arm, for example in the form of a cap, so as to allow increasing the flow rate drawn by the air inlet (so-called dynamic scoop).

Alternatively, the air inlet may be formed by a simple opening extending into the surface delimited by the arm.

The duct may be equipped with a heat exchanger housed in the arm. The exchanger may include fins allowing increasing the exchange surfaces with the air flowing in the arm.

Alternatively, the heat exchange between the air and the fluid circulating in the pipe may be carried out only through the wall, for example cylindrical, of the duct. The arm may include an air outlet.

The air outlet may be located at the radially outer end of the arm and may open into an element of the turbine engine located radially between the primary stream and the outflow region of the secondary flow.

This element may be a portion of an intermediate casing of a turbine engine, in particular in the case where the turbine engine is a turbofan engine.

The element may include at least one airflow circulation duct connecting the outlet of the arm to an opening of the element opening into the outflow region of the secondary flow.

The opening may be equipped with an exhaust grill. The exhaust grill may include fins for redirecting the airflow crossing it, so as to align the airflow derived from the grill with the direction of the secondary flow. Such a grill then allows not affecting too much the flow of the secondary flow.

The element may include a first duct connecting the outlet of the arm to a second duct connecting the primary flow path to the outflow region of the secondary flow.

The second duct may connect a flap or a controlled valve located at a radially outer wall of the primary flow path to the outflow region of the secondary flow. Such a valve (also called Variable Bleed Vane or V.B.V.) allows adjusting the flow rate of air circulating through the primary duct, for example so as to adjust the idle speed. Such a valve may also have the function of extracting debris or foreign bodies having entered the primary flow path, so as to protect the elements located downstream. Such foreign bodies may be hail, rain or dust for example. It should be noted that, in the case of hail extraction in particular, the risk of accumulation of ice at the outlet of the second duct is limited by the contribution of calories originating from the hot air derived from the arm.

The air outlet may be formed in the arm and may open into the primary flow path.

The air outlet may then be located in a downstream region of the arm, for example at the trailing edge.

The arm may include means for adjusting the section of the air inlet and/or of the air outlet. These adjustment means may include at least one movable member, whose position may be controlled and allows adjusting the section of the air inlet, possibly dynamically through a regulation.

The turbine engine may include a rectifier including blades located axially, partially or completely, opposite the arm. The blades may be located on either side of the arm. The blades may be interposed circumferentially between two arms.

The turbine engine may include a rectifier including blades located axially upstream of the arm. One of the blades of the rectifier may be located circumferentially opposite the arm.

The axial dimension of each rectifier blade may be smaller than the axial dimension of the arm. The circumferential dimension of each rectifier blade may be smaller than the circumferential dimension of the arm. The downstream end of each blade may be located upstream of the downstream end of the arm.

The arm may be located upstream of a low-pressure compressor.

In particular, such a feature is applicable to the case where the turbine engine includes a reducer between the rotor of the fan and a shaft connecting the low-pressure turbine and the low-pressure compressor. Indeed, such a reducer has a large mass and is generally located axially upstream of the low-pressure compressor. Moreover, the aforementioned arm is generally connected to a fixed portion of the aircraft, so as to achieve an anchorage or a fastening of the turbine engine on the aircraft. Thus, placing the arm upstream of the low-pressure compressor allows limiting the lever arm in the anchoring region and the mass formed by the reducer.

DETAILED DESCRIPTION

Figure 1:
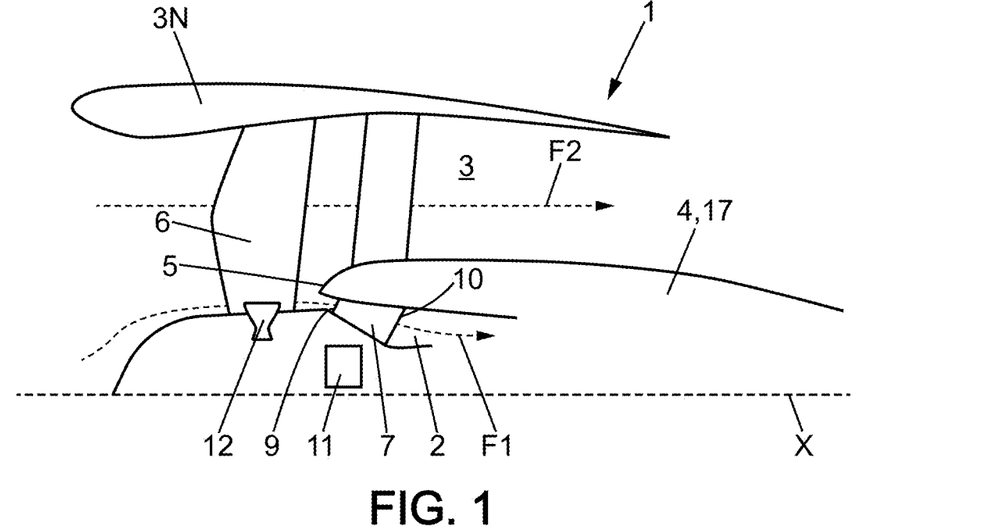
FIG. 1 is a schematic axial sectional half-view of a turbine engine according to the disclosure.
Figure 2:
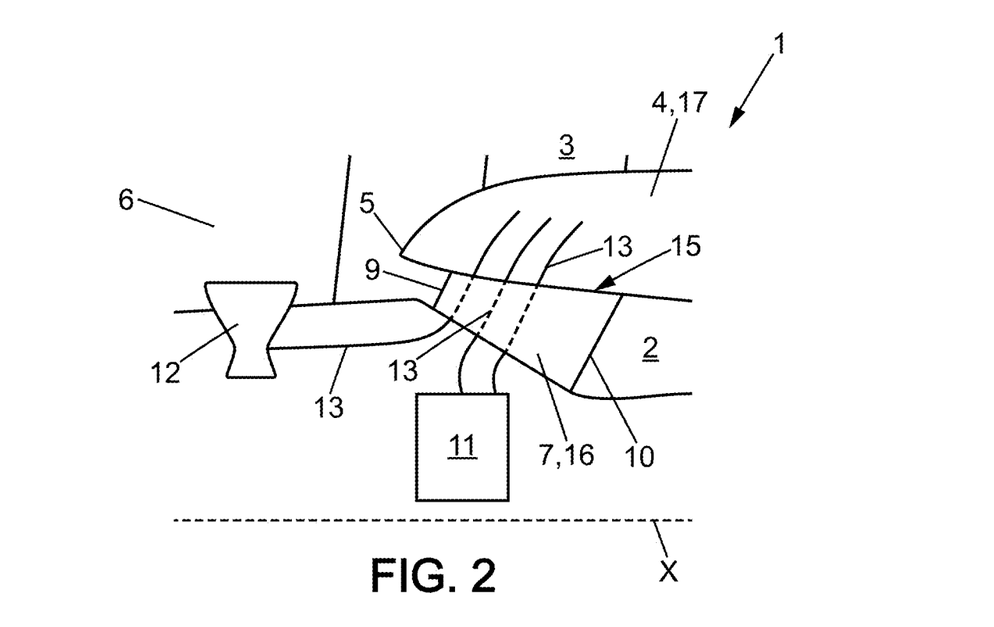
FIG. 2 is a schematic axial sectional view of a portion of the turbine engine.

FIGS. 1 and 2 schematically illustrate a turbine engine 1, in particular an aircraft turbofan engine, according to an embodiment of the disclosure. The turbine engine 1 extends according to an axis X.

The turbine engine 1 includes a flow path 2 for a primary flow, or primary flow path 2, including a compressor, a combustion chamber and a turbine, and a flow path 3 for a secondary flow, or secondary flow path 3, surrounding the primary flow path 2.

The upstream portion of the primary flow path 2 is separated from the secondary flow path 3 by a portion 4 of a so-called intermediate casing, delimiting in particular a separator nozzle 5.

The turbine engine 1 further includes a fan 6 located upstream of the primary flow path 2 and of the secondary flow path 3 while being, like the latter, ducted by a nacelle 3N.

The airflow passing through the fan 6 is split in two, namely a primary flow F1 entering the primary flow path 2 and a secondary flow F2 entering the secondary flow path 3.

Profiled arms 7 extend radially through the primary flow path 2, in particular upstream of the compressor, so as to enable the passage of transmission or auxiliary elements through the arms 7. In the represented example, these arms are in the inlet region of the primary flow path, axially proximate to the separator nozzle 5. Each arm 7 includes two lateral surfaces 8 connected upstream by a leading edge 9 and connected downstream by a trailing edge 10.

The turbine engine 1 may further include a power transmission box or a lubricated reducer 11.

The turbine engine 1 may further include a device 12 for changing the pitch of the fan blades 6, also lubricated.

The power transmission box or the reducer 11, and the pitch change mechanisms 12 are located in the radially inner portion of the turbine engine 1 and are supplied with lubricating oil by pipes 13. These pipes 13 cross the primary flow path 2 through at least one of the arms 7, in order to ensure the connection between these oil-consuming systems 11, 12 and systems ensuring the circulation as well as cooling of the oil, located radially outside the primary flow path 2.

Figure 3:
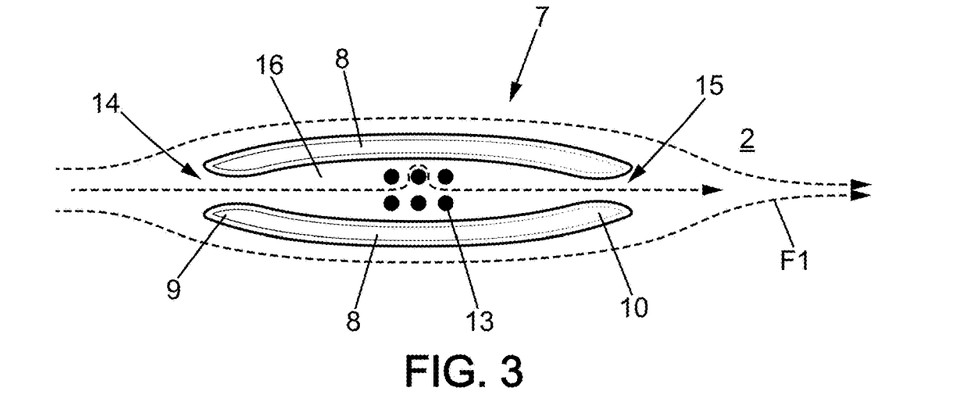
FIG. 3 is a schematic view according to a section plane perpendicular to the radial direction of extension of the arm, illustrating a first embodiment of the disclosure.

FIG. 3 illustrates the section of an arm 7 according to a plane perpendicular to the radial axis of extension of the arm 7. The arm 7 includes an air inlet 14 formed by a slot extending over at least one portion of the leading edge 9 of the arm 7. The arm 7 further includes an air outlet 15 formed by a slot extending over at least one portion of the trailing edge 10 of the arm 7.

In operation, cold air derived from the upstream end of the primary flow path 2 enters the inner volume 16 of the arm 7, in which the pipes 13 are housed, through the inlet 14, crosses the inner volume 16 while cooling the pipes 13, and is extracted from the inner volume 16 through the outlet 15 to come out again into the primary flow path 2.

Figure 4:
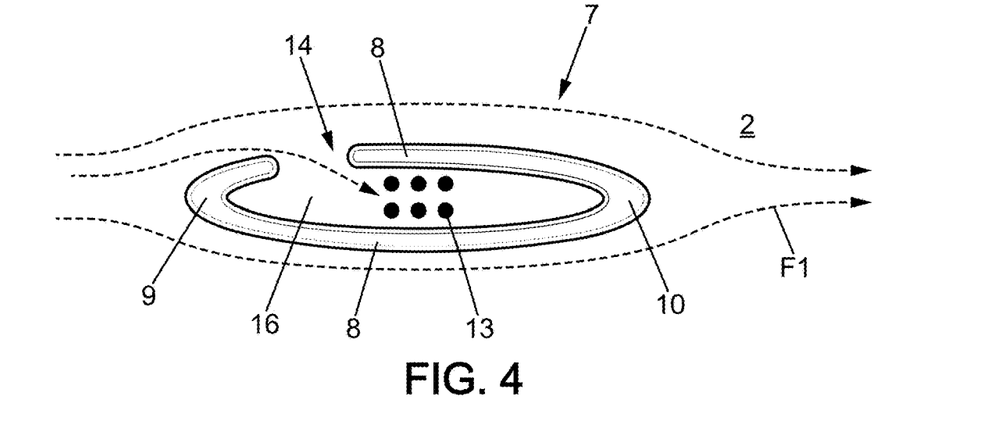
FIG. 4 is a view corresponding to FIG. 3, illustrating a second embodiment of the disclosure.

FIG. 4 illustrates another embodiment wherein the arm 7 includes an air inlet 14 formed by an opening at one of the lateral surfaces 8.

Figure 6:
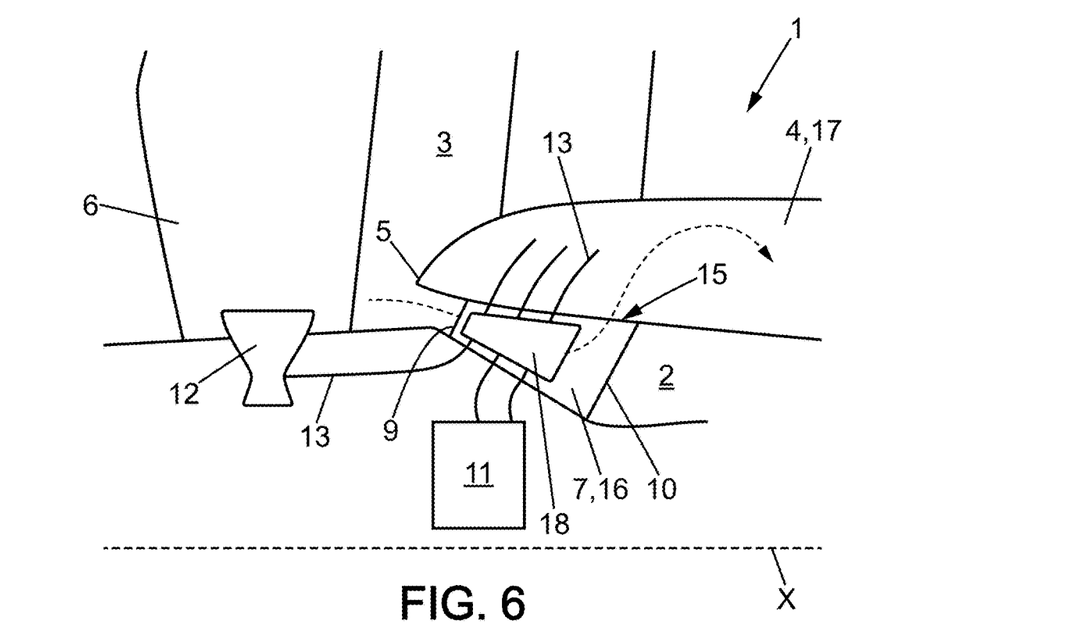
FIG. 6 is a view corresponding to FIG. 2, illustrating a fourth embodiment of the disclosure.

The air outlet 15 of the arm 7 is located at the radially outer end of the arm 7 so that, in operation, air enters the inner volume 16 through the inlet 14, circulates in the inner volume 16 of the arm 7 so as to cool the pipes 13 and escapes into the inner volume 17 of the portion 4 of the intermediate casing, as illustrated in FIG. 6. Also in this figure, the pipes 13 may be equipped with one or more heat exchanger(s) 18, for example provided with fins allowing favouring the heat exchange surfaces.

Figure 5:
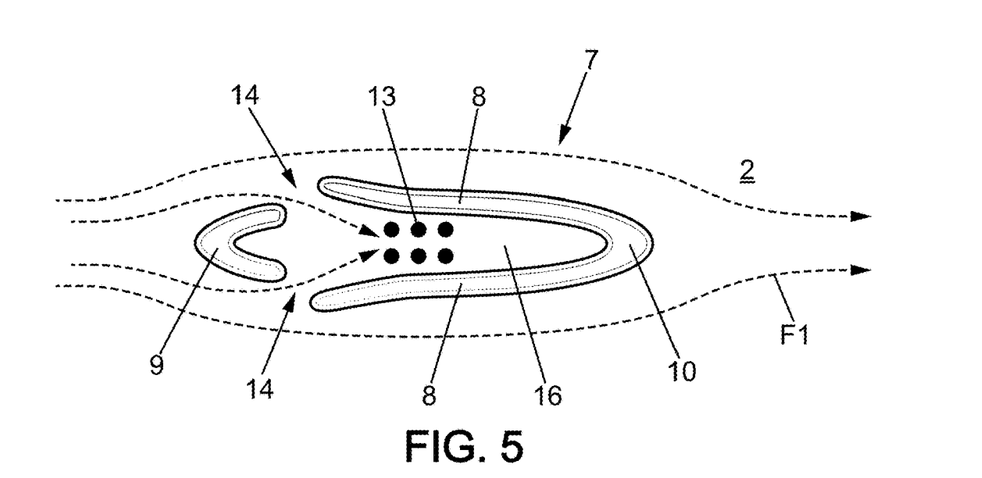
FIG. 5 is a view corresponding to FIG. 3, illustrating a third embodiment of the disclosure.

FIG. 5 illustrates another embodiment wherein the arm 7 includes two air inlets 14, formed by openings located respectively at each of the lateral surfaces 8 of the arm 7.

Each opening 14 may extend circumferentially from the corresponding lateral surface 18 of the arm 7, for example in the form of a cap, so as to allow increasing the flow rate drawn by the opening 14. Such an opening 14 forms a so-called dynamic scoop. Like before, the air outlet 15 of the arm 7 is located at the radially outer end of the arm 7 so that, in operation, air enters the inner volume 16 through the inlet 14, circulates in the inner volume 16 of the arm 7 so as to cool the pipes 13 and escapes into the volume 17 of the portion 4 of the intermediate casing.

Figure 7:
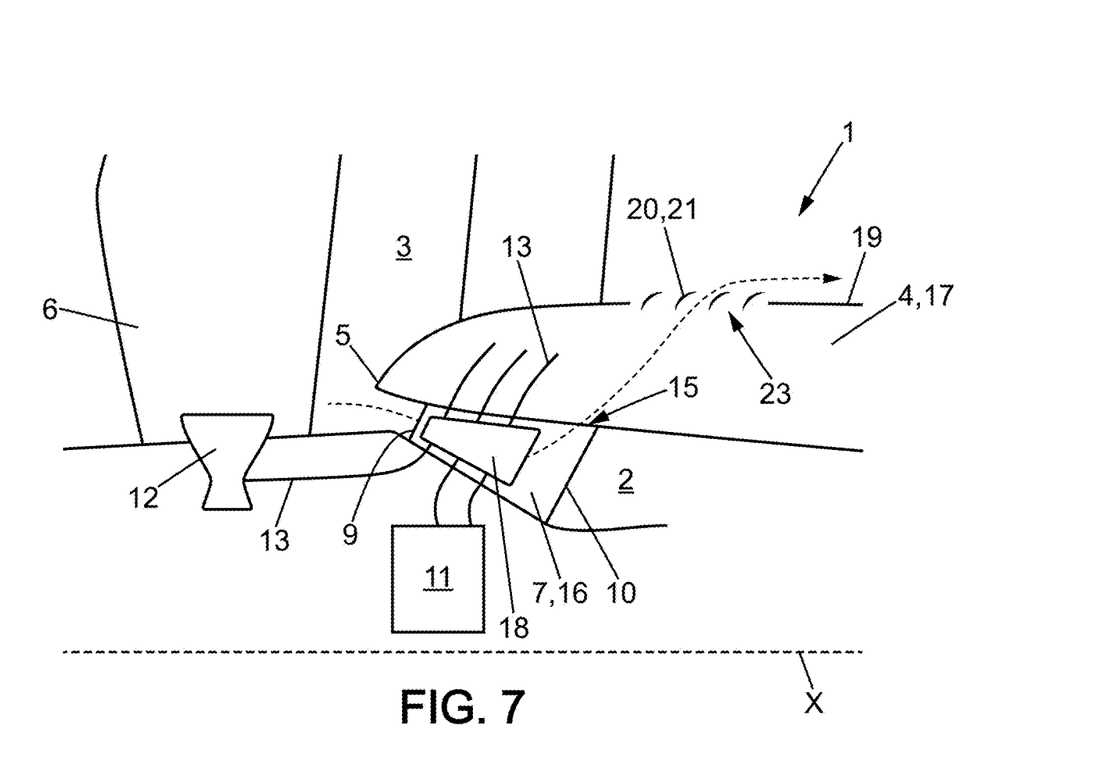
FIG. 7 is a view corresponding to FIG. 2, illustrating a fifth embodiment of the disclosure.

FIG. 7 illustrates another embodiment wherein the outer wall 19 of the portion 4 of the intermediate casing includes an exhaust grill 20 communicating with the secondary flow path 3.

The exhaust grill 20 may include fins 21 for redirecting the airflow passing therethrough, so as to align the airflow derived from the grill 20 with the direction of the secondary flow F2. Such a grill 20 then allows not affecting too much the flow of the secondary flow F2.

In operation, air derived from the arm 7 gets into the inner volume 17 of the portion 4 of the intermediate casing and is then discharged into the secondary flow path 3, through the exhaust grill 20.

According to a non-represented embodiment, a duct may connect the outlet of the arm 7, at the radially inner end of the arm 7, and the opening 23 of the wall 19 having the exhaust grill 20.

Figure 8:
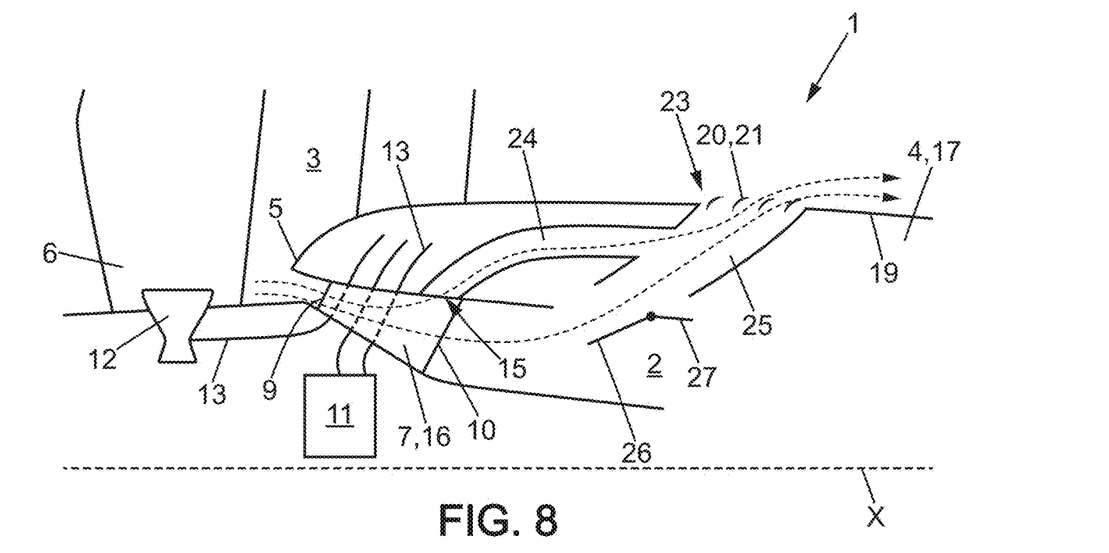
FIG. 8 is a view corresponding to FIG. 2, schematically illustrating a sixth embodiment of the disclosure.

FIG. 8 schematically illustrates another embodiment wherein the portion 4 includes a first duct 24 and a second duct 25. To make this figure more readable, the proportions of the ducts with respect to their environment are not met with respect to the proportions if these ducts were actually implemented in a real turbine engine. The first duct 24 connects the outlet 15 of the arm 7 and a middle region of the second duct 25. The second duct 25 connects a flap or a controlled valve 26 located at a radially outer wall 27 of the primary flow path 2, on the one hand, and the opening 23 equipped with the grill 20, on the other hand.

In particular, such a valve 26 (also called Variable Bleed Vane or V.B.V.) may allow adjusting the flow rate of air circulating through the primary flow path 2, for example so as to adjust the idle speed. Such a valve 26 may also have the function of extracting debris or foreign bodies having entered the primary flow path 2, so as to protect the elements of the turbine engine 1 located downstream, in particular the high-pressure compressor (not represented) knowing that a low-pressure compressor (not represented) is axially downstream of the arms and upstream of the valve.

Figure 9:
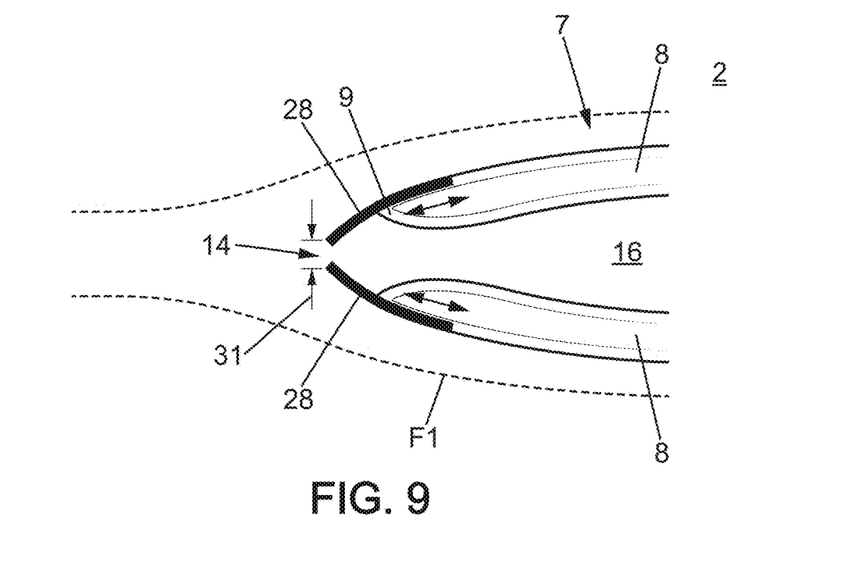
FIG. 9 is a detail view of a portion of the arm, illustrating a seventh embodiment of the disclosure.

FIG. 9 illustrates another embodiment wherein the arm 7 includes means 28 for adjusting the section 31 of the air inlet 14. These adjustment means 28 include at least one movable member whose position could be controlled and allows adjusting the section of the air inlet 14, possibly dynamically through a regulation. In this case, two opposite movable members are used, the air inlet 14 being delimited between the opposite ends of the movable members.

Figure 10:
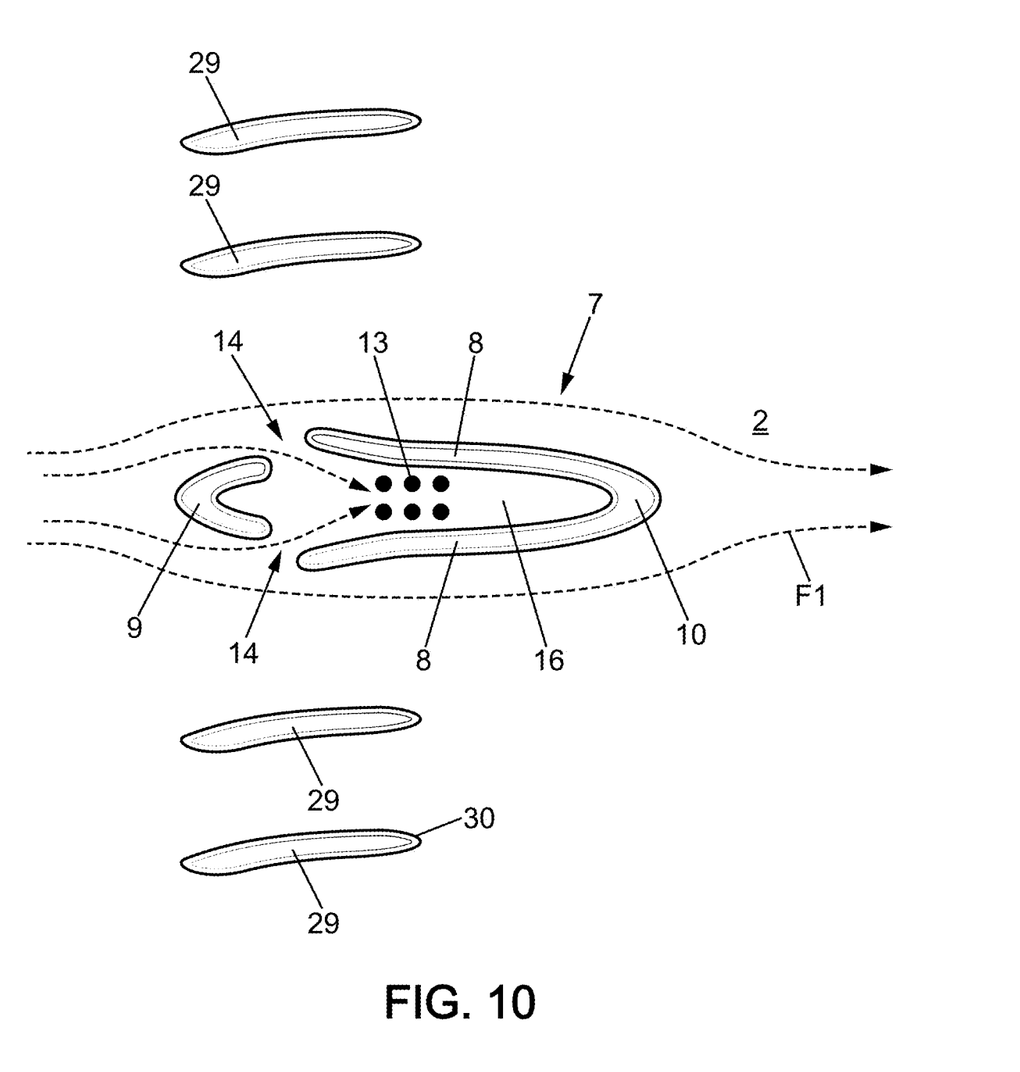
FIG. 10 is a view corresponding to FIG. 3, illustrating the positioning of the blades of a rectifier, the blades being located circumferentially on either side of the arm, in accordance with an eighth embodiment of the disclosure.

Moreover, as illustrated in FIG. 10, the turbine engine 1 may include a rectifier including blades 29 extending radially and located axially, partially or completely, opposite the arm 7 and located circumferentially on either side of the arm 7.

Figure 11:
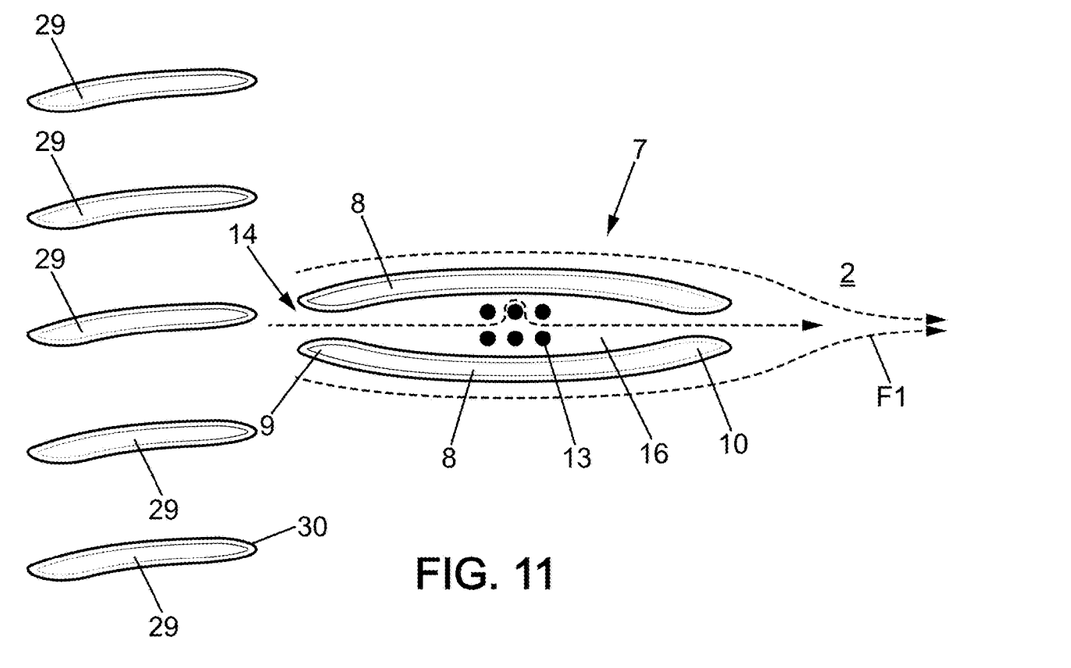
FIG. 11 is a view corresponding to FIG. 10, illustrating another embodiment wherein the arm is located downstream of the blades of the reducer.

FIG. 11 illustrates an embodiment wherein the arm is located downstream of the blades of the rectifier, the arm being moreover located circumferentially opposite one of the blades of the rectifier.

The axial dimension of each rectifier blade 29 is smaller than the axial dimension of the arm 7. The circumferential dimension of each rectifier blade 29 is smaller than the circumferential dimension of the arm 7.

Figure 12:
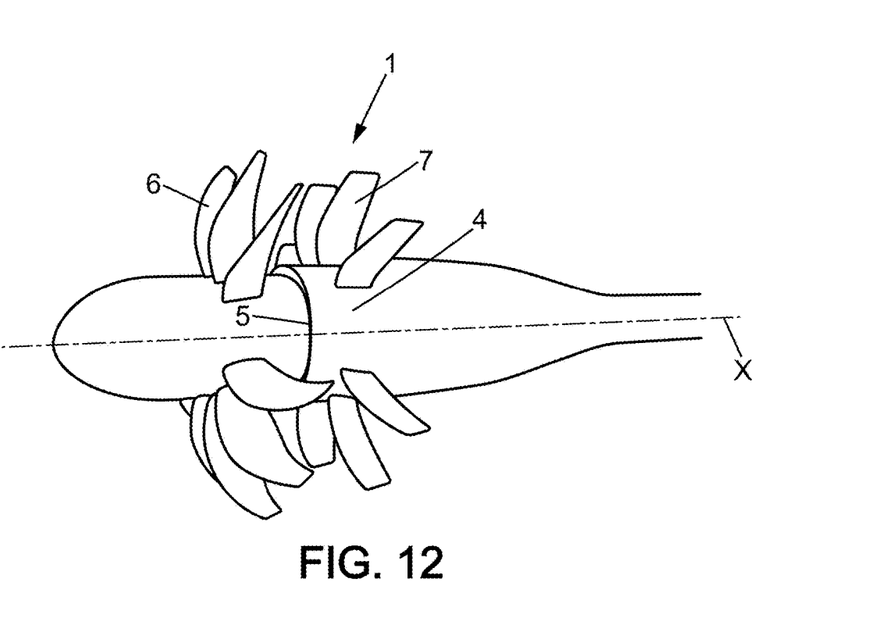
FIG. 12 is a perspective view of a turbine engine with a propeller type unducted fan.

The downstream end 30 of each blade 29 is located upstream of the trailing edge 10 of the arm 7. As illustrated in FIG. 12, the disclosure is also applicable to a turbine engine 1 with a propeller type unducted fan 6, including an open secondary flow region in which a rectifier 7 belonging to a stator is located. Such a structure is similar to the case of FIG. 1, the turbine engine 1 in this case including no nacelle 3N. Such a turbine engine 1 is also known by the acronym "USF" (standing for Unducted Single Fan).

The invention claimed is:

1. A turbine engine extending according to an axis, a circumferential direction around the axis and a radial direction perpendicular to the axis, comprising
a primary flow path for a primary flow, the primary flow path including a compressor, a combustion chamber, and a turbine,
a secondary flow path of a secondary flow, circumferentially surrounding the primary flow path, a fan or a propeller located upstream of the primary flow path and the secondary flow path of the secondary flow,
at least one arm extending radially through the primary flow path, and at least one fluid circulation pipe extending inside the at least one arm, the at least one fluid circulation pipe crossing an entire extent of the at least one arm from a first forward part of an intermediate casing to a radially inner portion of the turbine engine radially inward of the primary flow path,
an upstream portion of the primary flow path being separated from the secondary flow path by the first forward part of the intermediate casing, the intermediate casing located radially between the primary flow path and the secondary flow path, wherein the at least one arm includes an air inlet configured to receive an airflow from the primary flow path so as to cool the fluid circulating in said at least one fluid circulation pipe, the at least one arm including an air outlet located at a radially outer end of the at least one arm and opening into a second middle part of the intermediate casing which is aft of the first forward part of the intermediate casing, the second middle part of the intermediate casing comprising a first duct and a second duct and being located radially between the primary flow path and the secondary flow path, so that the air flow circulates through said air outlet then into the first duct, from the first duct into the second duct and then is discharged into the secondary flow path, the first duct connecting the air outlet of the at least one arm to the second duct, the second duct extends from and fluidly connects the primary flow path to the secondary flow path of the secondary flow.

2. The turbine engine according to claim 1, wherein the at least one arm includes two lateral surfaces defining at least one leading edge upstream and at least one trailing edge downstream, the air inlet being located at the leading edge and/or at least one of the two lateral surfaces of the at least one arm.

3. The turbine engine according to claim 2, wherein the air inlet extends circumferentially from at least one lateral surface of the two lateral surfaces of the at least one arm.

4. The turbine engine according to claim 1, wherein said second middle part of the intermediate casing includes the first duct and the second duct configured to circulate the airflow and connecting said air outlet of the at least one arm to an opening of said second middle part of the intermediate casing which opens into the secondary flow path of the secondary flow.

5. The turbine engine according to claim 1, wherein the at least one arm includes means for adjusting a section of the air inlet, the section of the air inlet corresponding to a width of the air inlet.

6. The turbine engine according to claim 1, wherein the at least one arm is located upstream of a low-pressure compressor.

7. The turbine engine according to claim 2, wherein the at least one arm includes two air inlets located respectively at each of the two lateral surfaces of the at least one arm.

8. The turbine engine according to claim 1, wherein the first duct extends axially in the second middle part of the intermediate casing and comprises a downstream end, the first duct being connected to the second duct at the downstream end.

9. The turbine engine according to claim 1, wherein the first duct connects the air outlet of the at least one arm to a middle region of the second duct.

10. The turbine engine according to claim 1, wherein the air outlet is formed by a slot extending over at least one portion of a trailing edge of the at least one arm.

* * * * *